(12) United States Patent
Babu J D

(10) Patent No.: US 12,277,264 B2
(45) Date of Patent: Apr. 15, 2025

(54) EYE TRACKING BASED VIDEO TRANSMISSION AND COMPRESSION

(71) Applicant: Magic Leap, Inc., Plantation, FL (US)

(72) Inventor: Praveen Babu J D, Plantation, FL (US)

(73) Assignee: Magic Leap, Inc., Plantation, FL (US)

( * ) Notice: Subject to any disclaimer, the term of this patent is extended or adjusted under 35 U.S.C. 154(b) by 54 days.

(21) Appl. No.: 18/037,709

(22) PCT Filed: Sep. 16, 2021

(86) PCT No.: PCT/US2021/050665
§ 371 (c)(1),
(2) Date: May 18, 2023

(87) PCT Pub. No.: WO2022/108652
PCT Pub. Date: May 27, 2022

(65) Prior Publication Data
US 2023/0409111 A1    Dec. 21, 2023

Related U.S. Application Data

(60) Provisional application No. 63/115,287, filed on Nov. 18, 2020.

(51) Int. Cl.
| | | |
|---|---|---|
| *G06F 3/01* | (2006.01) | |
| *G06T 7/50* | (2017.01) | |
| *G06V 10/25* | (2022.01) | |
| *H04N 19/103* | (2014.01) | |
| *H04N 19/162* | (2014.01) | |
| *H04N 19/164* | (2014.01) | |
| *H04N 19/167* | (2014.01) | |
| *H04N 19/17* | (2014.01) | |
| *H04N 19/59* | (2014.01) | |

(52) U.S. Cl.
CPC ............... *G06F 3/013* (2013.01); *G06T 7/50* (2017.01); *G06V 10/25* (2022.01); *H04N 19/59* (2014.11)

(58) Field of Classification Search
None
See application file for complete search history.

(56) References Cited

U.S. PATENT DOCUMENTS

| | | | | |
|---|---|---|---|---|
| 5,742,332 A | * | 4/1998 | Imai ...................... | G02B 30/27 348/E13.058 |
| 8,736,636 B2 | | 5/2014 | Kang | |
| 8,793,770 B2 | | 7/2014 | Lim | |
| 8,823,855 B2 | | 9/2014 | Hwang | |

(Continued)

FOREIGN PATENT DOCUMENTS

| | | | | |
|---|---|---|---|---|
| WO | WO-2017053971 A1 | * | 3/2017 | ............. A61B 3/113 |

OTHER PUBLICATIONS

International Search Report and Written Opinion in International Appln. No. PCT/US2021/050665, mailed Jan. 20, 2022, 8 pages.

*Primary Examiner* — Hung Q Dang
(74) *Attorney, Agent, or Firm* — Fish & Richardson P.C.

(57) ABSTRACT

A computer-implemented method includes receiving gaze information about an observer of a video stream; determining a video compression spatial map for the video stream based on the received gaze information and performance characteristics of a network connection with the observer; compressing the video stream according to the video compression spatial map; and sending the compressed video stream to the observer.

15 Claims, 4 Drawing Sheets

(56) References Cited

U.S. PATENT DOCUMENTS

| | | | |
|---|---|---|---|
| 8,874,673 B2 | 10/2014 | Kim | |
| 10,712,817 B1* | 7/2020 | Rönngren | G02B 27/0093 |
| 2012/0146891 A1 | 6/2012 | Kalinli | |
| 2018/0059780 A1* | 3/2018 | Mitchell | A63F 13/21 |
| 2018/0227630 A1* | 8/2018 | Schmidt | H04N 21/4728 |
| 2019/0174125 A1* | 6/2019 | Ninan | H04N 21/816 |
| 2020/0195944 A1 | 6/2020 | Di Cera et al. | |
| 2020/0280739 A1 | 9/2020 | Fitzgerald et al. | |
| 2020/0348517 A1 | 11/2020 | Mayrand | |

\* cited by examiner

EYE TRACKING BASED VIDEO TRANSMISSION AND COMPRESSION

This application is a National Stage Application of International Application No. PCT/US2021/050665, filed Sep. 16, 2021, which claims priority to U.S. Provisional Patent Application No. 63/115,287 filed on Nov. 18, 2020, of which is incorporated by reference in its entirety.

TECHNICAL FIELD

Background

Video streaming consumes a large amount of bandwidth, especially in three-dimensional (3D) environments. For example, in virtual reality (VR), augmented reality (AR), and/or mixed reality (MR) systems, a display device (e.g., head-mounted device) will receive video stream data from a server and display the received video stream data to a user in a spatial three-dimensional (3D) environment. Such video stream data usually has a big size, and uses a significant amount of bandwidth.

To reduce the bandwidth consumption, conventional methods may compress the video stream data to reduce the data size. However, conventional video compression algorithms may involve trade-offs between the degree of compression and the amount of distortion introduced. For example, to significantly reduce the size of the video stream data, conventional video compression algorithms may be lossy. As a result, the received video stream data may lose information, and the quality of the received video stream may be compromised, which may result in poor user experience.

Therefore, there is a need for an improved approach to process, compress, and transmit video stream data to reduce the bandwidth demand while still providing a satisfactory user experience.

SUMMARY

The technology described herein provides an eye tracking based video compression transmission method. Specifically, the technology described herein uses gaze information to determine the regions of interest (ROIs). Such ROIs are regions the observer/user is watching. The technology described herein can process the video stream data such that the regions being observed are displayed in higher fidelity, while other regions not being observed are displayed in lower fidelity. The video stream data can be compressed significantly to reduce the size of the video stream data and further reduce the demand for bandwidth. As a result, based on the real time gaze tracking information, the technology described herein can make better utilization of the bandwidth by increasing the visual acuity of the region of the video images being observed or watched.

In general, a first innovative aspect of the subject matter described in this specification can be embodied in a method performed by a data processing apparatus that includes receiving gaze information about an observer of a video stream; determining a video compression spatial map for the video stream based on the received gaze information and performance characteristics of a network connection with the observer; compressing the video stream according to the video compression spatial map; and sending the compressed video stream to the observer.

The subject matter described in this specification can be implemented in particular embodiments so as to realize one or more of the following advantages. The size of the video stream is significantly reduced, because the image content outside the ROI is significantly compressed. As a result, the demand for bandwidth is significantly reduced. Furthermore, because the ROI (e.g., area/location the observer is watching) is displayed in higher fidelity, the user experience is not compromised.

Various features and advantages of the foregoing subject matter are described below with respect to the figures. Additional features and advantages are apparent from the subject matter described herein and the claims.

BRIEF DESCRIPTION OF THE DRAWINGS

Like reference numbers and designations in the various drawings indicate like elements.

DETAILED DESCRIPTION

The technology described herein uses the gaze information to determine the regions of interest (ROIs) and compress the rest of the image while retaining higher image fidelity, e.g. a higher image resolution, within the ROIs. Furthermore, the human eye's visual acuity drastically reduces on several attributes when the image content/area is away from the center of focus. The technology described herein can leverage such traits and compress the image, such that there are less details present within areas what are away from the center of focus. For example, after compression, the compressed image may display the ROI with high fidelity while displaying the other areas, e.g., outside the ROI, with reduced image quality and reduced color quality.

Because the other areas outside the ROI are compressed, the size of the video stream data is reduced. Because the ROI, e.g., the area or location that the observer is watching is displayed with a higher image fidelity, the user experience is not compromised.

The technology described herein also provides finer control of the ROI. Specifically, the shape, size, and fidelity of the ROI can be adjusted based on various traits, such as eye gaze traits, individual traits, device traits, network traits, and the content type traits.

Figure 1:
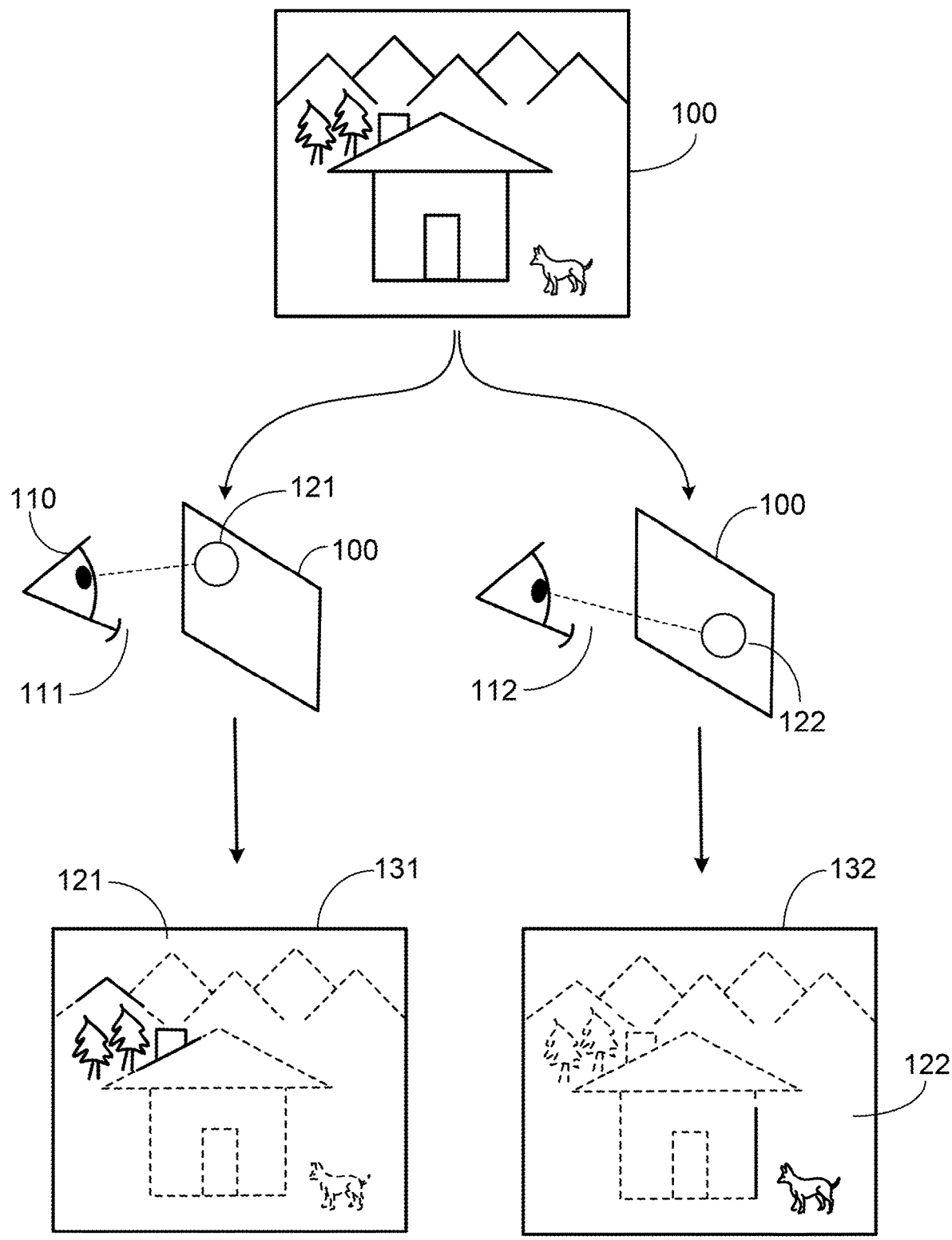
FIG. 1 is an example of tracking an observer's eye gaze and/or movement, according to an example embodiment.

FIG. 1 is an example of tracking an observer's eye gaze and/or movement, according to an example embodiment. Assume the observer is watching a streaming video from the Internet. The streaming video is provided by a streaming service server. If the streaming service server determines the area/location of the video the observer is watching, the streaming service server can dynamically change the compression techniques to optimize the location on the video, so that the location being watched has higher quality.

As shown in FIG. 1, an observer 110 is watching a video stream that includes a video image/frame 100. The video image/frame 100 is a source image in an uncompressed format. At a first moment, the observer 110 may be looking at a first location in the video image 100. The first location being watched is referred to as a first region of interest (ROI) 121 in the video image 100. Thus, the first gaze 111 of the observer is corresponding to the first ROI 121. Based on the first gaze 111 of the observer, the video image 100 can be compressed into a first compressed video image 131. As shown in the first compressed video image 131, the content corresponding to the first ROI 121 has higher fidelity (shown in solid line). The content in other locations (outside the first ROI) has lower fidelity (shown in dotted line).

At a second, later moment in time, the observer 110 may be looking at a second location in the video image 100. The second location being watched is referred to as a second ROI 122. Thus, the second gaze 112 of the observer is corresponding to the second ROI 122. Based on the second gaze 112 of the observer, the video image 100 can be compressed into a second compressed video image 132. As shown in the second compressed video image 132, the content corresponding to the second ROI 122 has higher fidelity (shown in solid line). The content in other locations (outside the second ROI) has lower fidelity (shown in dotted line).

In one embodiment, the live video streaming is in a one-to-one scenario, where the video can be compressed by the sender based on the gaze of the receiver. In another embodiment, the live video streaming is in a many-to-many scenario, where the video can be compressed by a coordinating server (or sender) that creates individual streams individualized for each receiver. In some embodiments, the server (or remote rendering servers) can use the target user gaze, e.g., the area/location the observer will be watching, and not only optimize the video but also generate video content based on the target gaze.

Figure 2:
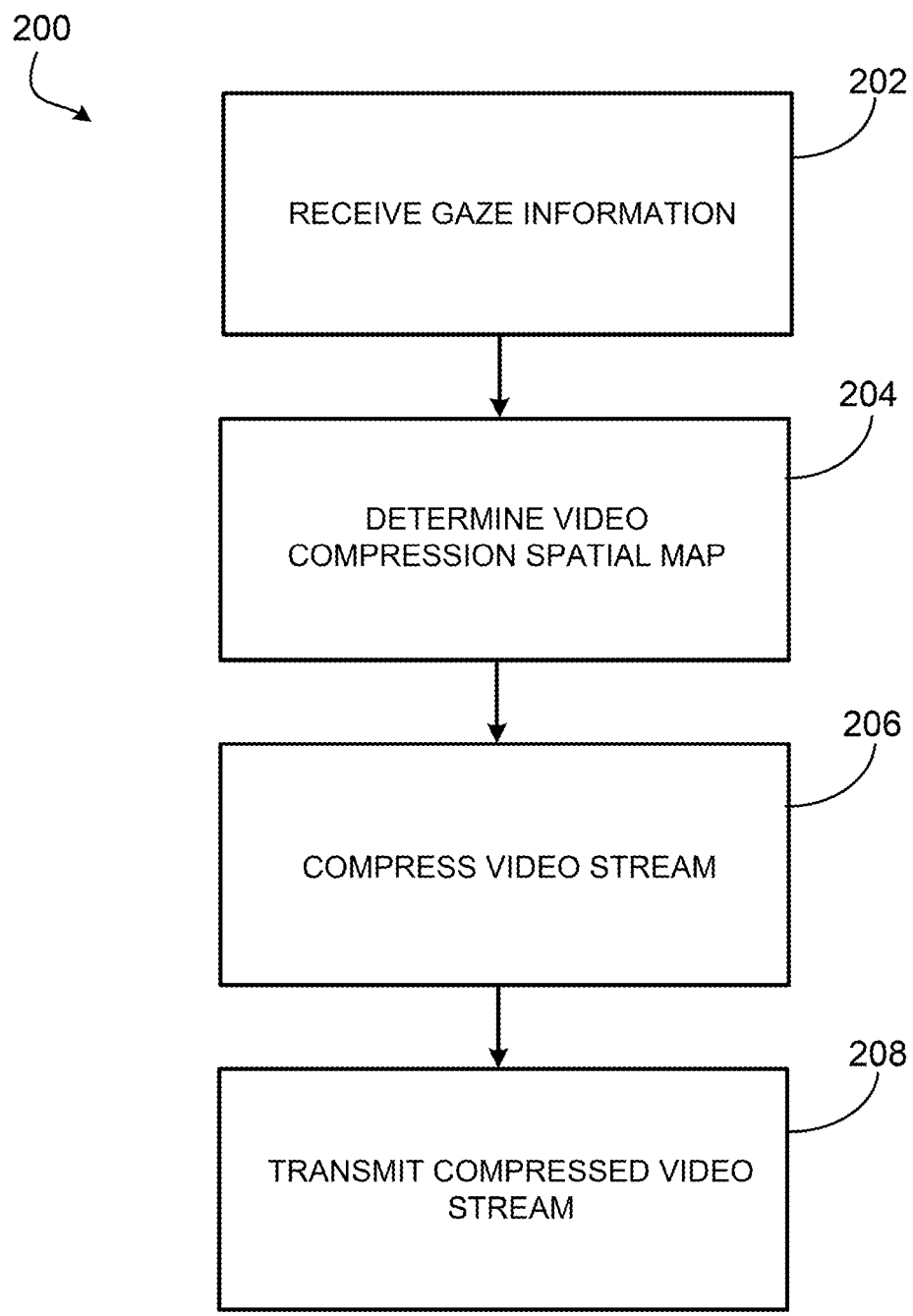
FIG. 2 is a flowchart of the video stream data processing and transmission, according to an example embodiment.

FIG. 2 is a flowchart of the video stream data processing and transmission, according to an example embodiment.

At step 202, gaze information about an observer of a video stream is received. The gaze information can be received from a head-mounted or a display-mounted gaze tracker. The gaze information includes information about instantaneous eye position.

In some embodiments, the observer may be a user watching a video stream on a video display device. The video display device can be any device comprising a gaze tracker. For example, the video display device can be a head-mounted device in AR/VR/MR systems that includes one or more sensors. The one or more sensors can provide real time tracking of the gaze information, such as human eye movement data.

The visual field of the human eye roughly spans 110~120 degrees. Human vision behaves differently depending on the degree of the vision away from the central region. Human vision has the highest resolution (density) in the fovea region giving a high visual acuity between angles of 2~5 degrees. The visual acuity decreases the further away from the fovea. Generally the decrease is logarithmic depending on the eccentricity.

The human eye also has traits in movement speed which can reach up to 900 deg/s but this velocity is not linear. There is a non-linear correlation between amount to move and velocity. In general, the lesser the required movement, the smaller the velocity and starts to plateau after 20 deg.

The focus speed of the human eye is another parameter. Studies suggest various numbers, the lowest being 13 ms up to 100 ms. The human perception has various traits depending on the content being observed. Various research indicates several other parameters such as change to brightness, content (text, image) etc., that have an impact on the lag for humans to successfully perceive an object.

The gaze tracker of the video display device can collect the gaze information, e.g., eye movement data, including the visual field, the eye movement speed, the focus speed, and others. The video display device can transmit the gaze information to a server. Such gaze information can indicate where the observer is looking at. As a result, the server can optimize the video to have higher fidelity images at the location being observed and adjust quality for regions that have less impact, such as regions that are not observed by the user.

The head-mounted device or other devices that track the eye gaze/movement and other traits can be used effectively to provide the needed information to achieve optimization of the video frames. The size of the data containing the traits and gaze information is significantly smaller in size than the video frames. The technology described herein can parameterize the gaze information and leverage such information for optimization of video transmission and real time video content generation. The technology described herein can also provide the right configuration to display the regions of interest (ROIs) in an image with the appropriate image quality.

At step 204, a video compression spatial map for the video stream is determined based on the received gaze information and performance characteristics of a network connection with the observer.

The human eye traits and other device traits are captured by the video display device, e.g., the head-mounted device, and sent to the server that provides the video stream. Moreover, the server may obtain network traits. The human eye traits can include the gaze information. The network traits can include the performance characteristics of a network connection between the server and the observer.

After receiving the incoming traits, the server can parameterize the incoming traits. During the parameterization process, the server can convert the traits into a plurality of parameters that can be used by the compressor or content generator. For example, the video compressor of the server can take in the raw video stream and the parameters for each frame and generate a compressed video stream. The compressed video stream can be transmitted over the network at real time. The video display device can comprise a decompressor. After receiving the compressed video stream at the video display device, the decompressor is used to decompress the compressed video stream for presentation/display.

As discussed above, a plurality of parameters are obtained during the parameterization process. One of the parameters is ROI_Center. The server can translate eye focus position onto generated image. For example, the server can translate the eye gaze trait onto the image by converting the eye look at direction onto a 2D (two-dimensional) point on the image the eye is looking at. Assume the user is originally looking at position A, an example of position A can be posA=(a, b). Furthermore, the position A (a, b) can be extrapolated based on eye movement direction, eye movement speed, and network latency. The extrapolated position is for predicting where the user would be looking at by the time the image is delivered. Assume the extrapolated position is B, $$posB=(fa,fb)=posA+\text{Eye-Movement-Dir}\times\text{Eye-Movement-Speed}\times\text{Transmission-latency}.$$

In some other embodiments, the eye movement direction is projected from eye rotation directions onto a 2D planar movement. Alternatively, posB can be calculated using the eye rotation speed. For example, $$posB=(fa,fb)=\text{Eye-direction Eye-Rotation-Movement}\times\text{Transmission-latency}.$$

There are other ways to establish the center of the region of interest for each eye. The corresponding parameter of the center of ROI is ROI_Center, and ROI_Center=posB=(fa, fb).

Another parameter is a bandwidth factor corresponding to network/data-channel attributes. Assume maximum required bandwidth is denoted by "Max_Needed_B", which is based on the size of an uncompressed image. Assume current bandwidth is denoted by "Bw". "Bw_Factor" is a factor that denotes the needed compression from a bandwidth perspective. Bw_Factor=Bw/Max_Needed_Bw.

Bw_Factor is in a range between 0.0 and 1.0. A value close to 1.0 indicates good bandwidth, and a value close to 0.0 indicates poor bandwidth.

Another parameter is the shape of ROI. Region of interest can be treated as a mask which can algorithmically define the required quality based on the distance from the ROI_Center. The further the image area from the ROI_Center, the less needed quality. Quality of image area is inversely proportional to the distance from the ROI_Center. The shape doesn't necessarily need to be a circle. It will be based on the individual user's traits. ROI_Shape denotes the shape of the ROI. Image area outside the ROI is treated as needing low quality. Different ROI_Shapes are used for different attributes such as color, quality, and resolution.

Assume ROI_Shape_Max denotes the shape which completely encapsulates the entire image. Assume ROI_Shape as the "acceptable" shape given the available bandwidth. Assume maximum required bandwidth is denoted by "Max Bw". Max Bw is based on current uncompressed image taking ROI_Shape_Max. Assume current bandwidth is denoted by "Bw". The ROI_Shape parameter can be derived as ROI_Shape=ROI_Shape_Max×Bw_Factor.

Several shapes are created for different attributes, such as color, resolution, and quality. Specifically, ROI_Shape_Color=ROI_Shape_Max_Color×Bw_Factor;

ROI_Shape_Resolution=ROI_Shape_Max_Resolution×Bw_Factor;

ROI_Shape_Quality=ROI_Shape_Max_Quality×Bw_Factor.

Another parameter is latency factor, denoted by "Lat_Factor," which is corresponding to network/data-channel attributes. Assume the current network latency is denoted by "NL". Assume the maximum supported distance the eye could have moved is denoted by ROI_Offset_Max. This is in addition to the compensation already done in calculating the ROI_Center.

Assume the maximum acceptable network latency is denoted by "Max_NL". Max_NL is based on the time it takes for the eye to move from the ROI_Center to the closest edge of the ROI_Shape. Assume the maximum eye movement velocity of an individual is given by MAX_EYE_VELOCITY. The maximum acceptable network latency can be derived as Max_NL=ROI_Offset_Max/MAX_EYE_VELOCITY.

The latency factor can be derived as

Lat_Factor=NL/Max_NL.

Lat_Factor is a value in the range of (0.0 to 1.0). A value close to 0.0 indicates good performance in terms of latency. A value close to 1.0 indicates poor performance in terms of latency.

Another parameter is ROI_Offset_Shape. ROI_Offset_Shape is a shape centered around the ROI_Center. Image content inside the ROI_Offset_Shape is treated as needing maximum image quality. The size of the ROI_Offset_Shape is modified based on the Lat_factor. Smaller Lat_factor indicates smaller ROI_Offset. Assume minimum size of ROI_Offset_Shape is given as "ROI_Offset_Shape_MF". The parameter ROI_Offset_Shape can be derived as ROI_Offset_Shape=ROI_Offset_Max×Lat_Factor.

ROI_Offset_Shape is a value in the range of (ROI_Offset_Shape_MF to ROI_Offset_Max);

Several offset shapes can be obtained for different attributes, including color, resolution, and quality. The corresponding parameters of these offset shapes include ROI_Offset_Shape_Color, ROI_Offset_Shape_Resolution, and ROI_Offset_Shape_Quality.

Therefore, a plurality of parameters are obtained based at least on the received gaze information and the performance characteristics of the network connection. After obtaining the plurality of parameters as described above, the video compression spatial map is determined for the video stream. More specifically, the determining of the video compression spatial map includes identifying a center of a region of interest (ROI) corresponding to a predicted eye position; selecting a first shape for the ROI; and selecting a video compression profile that includes higher compression outside the first shape. For example, the center of the ROI is corresponding to the parameter ROI_Center discussed above. ROI_Center=posB=(fa, fb). The first shape of the ROI is corresponding to the parameter ROI_Shape discussed above.

The video compression profile corresponds to a video quality profile, a video resolution profile, and/or a video color profile. For example, the parameters ROI_Shape_Color, ROI_Shape_Resolution and ROI_Shape_Quality can indicate the different shapes for different attributes. The compression profile for each attribute includes higher compression outside the corresponding shape.

The video compression profile increases with a distance from the center of the ROI. The further an image area away from the center of the ROI, the larger the compression rate for that image area. In other words, image areas further away from the center of ROI are compressed more significantly, and thus have less fidelity. However, since the observer is not focusing on such areas, the low fidelity areas do not impact user experience. The compression rate of the image area increases with the distance from the center of the ROI. The relationship between the compression rate and the distance can be a step function, a smoothed step function, or a logarithmic function.

The performance characteristics of the network connection include information about available bandwidth. The determining of the video compression spatial map includes scaling a size of the first shape in proportion to a ratio of the available bandwidth to a bandwidth for the video stream without compression. More specifically, as discussed above, because ROI_Shape=ROI_Shape_Max×Bw_Factor, where Bw_Factor=Bw/Max_Needed_Bw,
the size of the first shape (e.g., ROI_Shape) is in proportion to a ratio of the available bandwidth (e.g., Bw) to a bandwidth for the video stream without compression (e.g., Max_Needed_Bw).

The gaze information includes information about instantaneous eye velocity. The performance characteristics of the network connection include information about network latency. The center of the region of interest corresponds to the instantaneous eye position plus an offset proportional to the instantaneous eye velocity times the network latency. More specifically, as discussed above, posB=(fa, fb)=posA+Eye-Movement-Dir×Eye-Movement-Speed×Transmission-latency. The parameter posA corresponds to the instantaneous eye position. The center of the ROI (e.g., posB) is the predicted eye position, which corresponds to the instantaneous eye position (e.g., posA) plus an offset proportional to the instantaneous eye velocity (e.g., Eye-Movement-Speed) times the network latency (e.g., Transmission-latency).

The determining of the video compression spatial map further includes selecting a second shape within the first shape of the region of interest and sharing the center of the region of interest; scaling the size of the second shape in proportion to the network latency times a maximum eye velocity; and selecting a video compression profile that includes (1) lower compression inside the second shape, (2) medium compression outside the second shape but inside the first shape; and (3) higher compression outside the first shape. More specifically, the second shape is corresponding to the parameter ROI_Offset_Shape as discussed above. As shown above, ROI_Offset_Shape=ROI_Offset_Max×Lat_Factor, where Lat_Factor=NL/Max_NL,
where Max_NL=ROI_Offset_Max/MAX_EYE_VELOCITY.

Thus, ROI_Offset_Shape=NL×MAX_EYE_VELOCITY.

Accordingly, the size of the second shape (ROI_Offset_Shape) is in proportion to the network latency (NL) times a maximum eye velocity (MAX_EYE_VELOCITY).

The image content within the second shape requires higher fidelity, thus the compression inside the second shape is lower. The image content outside the second shape but inside the first shape requires medium fidelity, thus the compression outside the second shape but inside the first shape is medium. The image content outside the first shape requires lower fidelity, thus the compression outside the first shape is higher. In some embodiments, the low compression is zero compression. The maximum eye velocity (MAX_EYE_VELOCITY) is a human saccadic eye velocity. An illustration of the first shape and the second shape is shown in FIG. 3.

At step 206, the video stream is compressed according to the video compression spatial map. The compression inside the second shape is lower. The compression outside the second shape but inside the first shape is medium. The compression outside the first shape is higher.

At step 208, the compressed video stream is sent to the observer. The video display device associated with the observer can decompress the compressed video stream and display the decompressed video stream to the observer.

Figure 3:
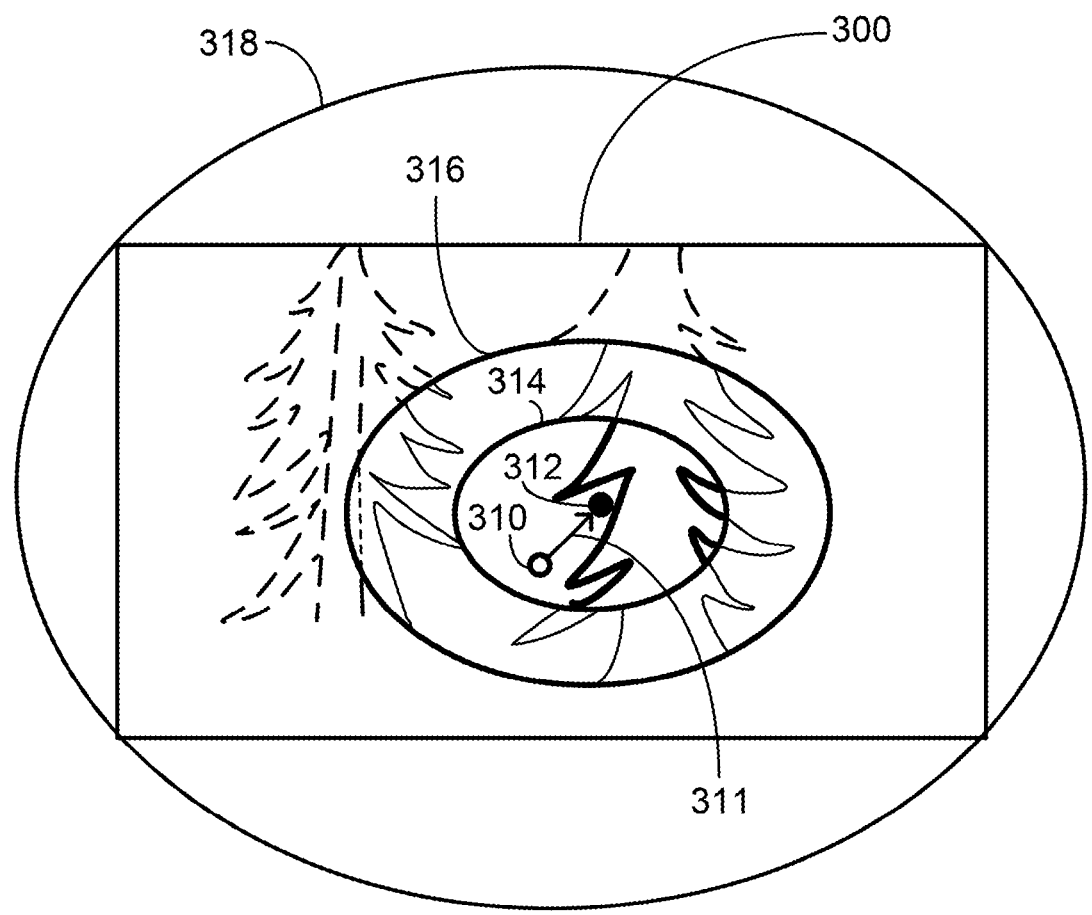
FIG. 3 is a video compression spatial map, according to an example embodiment.

FIG. 3 is a video compression spatial map 300, according to an embodiment. As shown in FIG. 3, the instantaneous eye position is 310. A predicted eye position is 312, which is the center of the ROI. The predicted eye position is for predicting where the user would be looking at by the time the image is delivered. The center of the ROI 312 corresponds to the instantaneous eye position 310 plus the latency offset 311, which is an offset proportional to the instantaneous eye velocity time the network latency. The first shape of the ROI is 316. The second shape of the ROI is 314. As shown in the figure, the second shape 314 is within the first shape 316 and sharing the center of the ROI 312. The maximum ROI shape (ROI_Shape_Max) 318 is the shape which completely encapsulates the entire image.

The image content within the second shape 314 has the highest fidelity. The image content outside the second shape 314 but inside the first shape 316 has medium fidelity. The image content outside the first shape 316 has the lowest fidelity.

Figure 4:
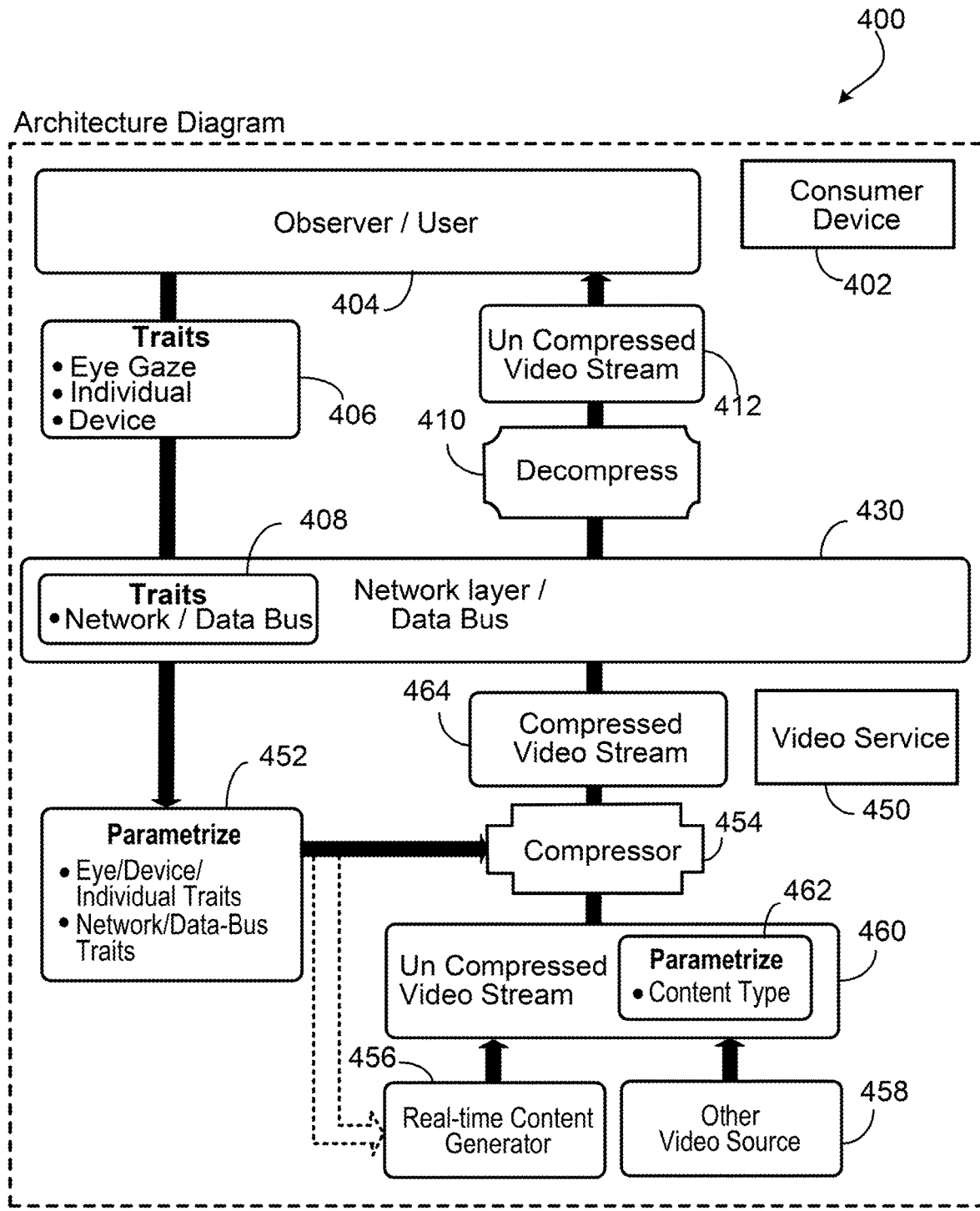
FIG. 4 is an architecture diagram for the video stream data processing and transmission, according to an example embodiment.

FIG. 4 is an architecture diagram 400 for the video stream data processing and transmission, according to an embodiment. As shown in FIG. 4, the consumer device 402 and the video service server 450 are connected with each other over a network layer/data base 430. The consumer device 402 can be a video display device, such as a head-mounted device or any other devices that can track the eye movement/gaze information of an observer/a user 404. The consumer device 402 can collect the various user end traits 406 including the eye gaze traits, individual traits, and device traits. The consumer device 402 can transmit the collected various user end traits 406 to the video service server 450 over the network layer/data bus 430.

The video service server 450 can receive the user end traits 406 from the consumer device 402. Furthermore, the video service server 450 can obtain the traits 408 of network/data bus. The network/data bus traits 408 can include performance characteristics of the network layer/data bus 430 between the consumer device 402 and the video service server 450.

Based on both the user end traits 406 (including eye gaze traits, individual traits, and device traits) and the network/data bus traits 408, the video service server 450 can perform parameterization. Specifically, during the parameterization process, the video service server 450 can convert the traits 406, 408 into trait parameters 452 that can be used by the compressor 454 or the real time content generator 456. The uncompressed video stream 460 can be generated by the real time content generator 456 or from other video source 458. Based on the content type of the uncompressed video stream 460, a content type parameter 462 can be determined. The compressor 454 can take in the uncompressed video stream 460, the content type parameter 462, and the other trait parameters 452 obtained from both the user end traits 406 (including eye gaze traits, individual traits, and device traits) and the network/data bus traits 408. The compressor 454 can generate a compressed video stream 464 based on the uncompressed video stream 460, the content type parameter 462, and the trait parameters 452.

The compressed video stream 464 can be transmitted over the network layer/data bus 438 at real time to the consumer device 402. The consumer device 402 can comprise a decompressor 410. After receiving the compressed video stream 464, the decompressor 410 can decompress the compressed video stream to obtain uncompressed video stream 412. The uncompressed video stream 412 can be displayed to the observer/user 404.

As discussed above, a plurality of trait parameters 452 are derived from the eye gaze traits, individual traits, and device traits. The trait parameters 452 are interpretations of the traits into a data that can be used by the compressor. For example, traits of "eye gaze direction" can be parameterized as the position where the user would be looking at within the video. If the user is looking at the bottom left of a video, a coordinate system parameter corresponding to the position at the bottom left can be (0, 0). A coordinate system parameter corresponding to the top right can be (1, 1).

There are several traits to human perception. The following are some of the traits that can be parameterized. However, the traits to human perception that can be parameterized are not limited to the following traits.

One of the traits is eye gaze. Distance (Degrees) away from the fovea affects the needed accuracy of the following attributes of an image, including color, brightness, and quality. Each attribute has different rates of decay based on distance, but they all, in general decrease in human need for accuracy. Based on the trait of eye gaze, a parameter corresponding to gaze point (also referred to "gaze point parameter") can be obtained.

Another trait is eye movement speed. The "distance/degrees from fovea" parameter is useful in predicting the final quality of an image assuming the eye doesn't move. Since the eye moves, it is required to take into account the movement speed and the time to focus. The focus speed of the human eye is another parameter, which can be from 13 ms to 100 ms. The parameters corresponding to the trait of eye movement speed can include movement speed/direction parameter and focus speed parameter.

Some parameters can be obtained from the location and time. Human eyes use different traits based on observing night or day content. Such parameters include day/night mode.

Some other parameters can be obtained based on individual traits. Every individual has various physical and mental capabilities that affect the accuracy of visual traits. A bias/exaggeration/graphs can be generated and can be used to fine tune for an individual user. Attribute graphs can be used to calculate the required accuracy of a pixel based on how far away from the "gaze point parameter" the pixel is. Parameters corresponding to the individual traits include IPD (inter-pupillary distance), color attribute graphs, brightness attribute graphs, quality (resolution) attribute graphs, and distance/depth attribute graphs.

Some other parameters can be obtained from network traits. Since the human eye/gaze keeps moving, accommodating for network lag becomes important. In addition, the current network bandwidth can be taken into accommodation to control how tightly or loosely the traits can be used to best leverage the current bandwidth. The parameters corresponding to the network traits include bandwidth and latency.

As discussed above, a content type parameter 462 can be obtained and used by the compressor. The type of content being streamed affects the human traits. For example, text triggers a different perception and observation capabilities. Humans usually recognize text faster than image.

The compressor 454 is where an uncompressed video is compressed for either video transmission or storage purpose. A video codec is usually used for encoding (compressing) video. Most video codecs, such as H.264, H.265, VP8, MP4, DivX, etc., perform some form of video compression that incorporates general human traits for removing color variations that are imperceptible to the human eye etc.

Some video codecs, such as H.264 and H.265, also support a feature called region of interest (ROI). ROI allows specifying regions within a frame that needs higher quality (e.g., less compression) in the region of interest and higher lossy compression outside the region of interest. For images, Jpeg2000 (which is an image compression standard and coding system) allows similar features.

A new dedicated codec will need to be created that allows finer control of the ROI mask and also to specify different ROI parameters. The technology described herein allows the finer control of the ROI. Specifically, the shape and the size of the ROI can be controlled by the parameters gathered during the parameterization stage. Different attributes can have different ROI masks. For example, color can have its own ROI mask different in shape and size from other traits. A higher latency data bus/network parameter can compensate by making the ROI region larger. This allows for compensation of the user having his/her gaze changed by the time he/she receives the video image at the expense of generating less bandwidth optimal images. The position of the ROI can be controlled by the gaze point.

The decompressor 410 on the consumer device 402 is where a video codec is used for decoding the compressed video stream.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A computer-implemented method comprising:
receiving gaze information about an observer of a video stream, wherein the gaze information includes information about instantaneous eye position and instantaneous eye velocity;
determining a video compression spatial map for the video stream based on the received gaze information and performance characteristics of a network connection with the observer, wherein the determining of the video compression spatial map includes:
selecting a first shape for a region of interest;
selecting a first video compression profile that includes higher compression outside the first shape;
selecting a second shape within the first shape of the region of interest and sharing a center of the region of interest;
scaling a size of the second shape in proportion to a network latency times a maximum eye velocity; and
selecting a second video compression profile that includes: (1) lower compression inside the second shape; (2) medium compression outside the second shape, but inside the first shape; and (3) higher compression outside the first shape, and
wherein the performance characteristics of the network connection include information about the network latency, and comprising:
identifying the center of the region of interest corresponding to a predicted eye position, wherein the center of the region of interest corresponds to the instantaneous eye position plus an offset proportional to the instantaneous eye velocity times the network latency;
compressing the video stream according to the video compression spatial map; and
sending the compressed video stream to the observer.

2. The method of claim 1, wherein the receiving of the gaze information is a receiving of gaze information from a head-mounted or display-mounted gaze tracker.

3. The method of claim 1, wherein:
the first video compression profile corresponds to a video quality profile, a video resolution profile, or a video color profile.

4. The method of claim 1, wherein the first video compression profile increases in compression with distance from the center of the region of interest.

5. The method of claim 1, wherein:
the performance characteristics of the network connection include information about available bandwidth; and
the determining of the video compression spatial map includes scaling a size of the first shape in proportion to a ratio of the available bandwidth to a bandwidth for the video stream without compression.

6. The method of claim 1, wherein the lower compression is zero compression.

7. The method of claim 1, wherein the maximum eye velocity is a human saccadic eye velocity.

8. A computer-implemented system, comprising:
one or more processors; and
one or more computer memory devices interoperably coupled with the one or more processors and having tangible, non-transitory, machine-readable media storing one or more instructions that, when executed by the one or more processors, perform one or more operations, comprising:
receiving gaze information about an observer of a video stream, wherein the gaze information includes information about instantaneous eye position and instantaneous eye velocity;
determining a video compression spatial map for the video stream based on the received gaze information and performance characteristics of a network connection with the observer, wherein the determining of the video compression spatial map includes:
selecting a first shape for a region of interest;
selecting a first video compression profile that includes higher compression outside the first shape;
selecting a second shape within the first shape of the region of interest and sharing a center of the region of interest;
scaling a size of the second shape in proportion to a network latency times a maximum eye velocity; and
selecting a second video compression profile that includes: (1) lower compression inside the second shape; (2) medium compression outside the second shape, but inside the first shape; and (3) higher compression outside the first shape, and
wherein the performance characteristics of the network connection include information about the network latency, and comprising:
identifying the center of the region of interest corresponding to a predicted eye position, wherein the center of the region of interest corresponds to the instantaneous eye position plus an offset proportional to the instantaneous eye velocity times the network latency;
compressing the video stream according to the video compression spatial map; and
sending the compressed video stream to the observer.

9. The computer-implemented system of claim 8, wherein the receiving of the gaze information is a receiving of gaze information from a head-mounted or display-mounted gaze tracker.

10. The computer-implemented system of claim 8, wherein:
the first video compression profile corresponds to a video quality profile, a video resolution profile, or a video color profile.

11. The computer-implemented system of claim 8, wherein the first video compression profile increases in compression with distance from the center of the region of interest.

12. A non-transitory, computer-readable medium storing one or more instructions executable by a computer system to perform one or more operations, comprising:
receiving gaze information about an observer of a video stream, wherein the gaze information includes information about instantaneous eye position and instantaneous eye velocity;
determining a video compression spatial map for the video stream based on the received gaze information and performance characteristics of a network connection with the observer, wherein the determining of the video compression spatial map includes:
selecting a first shape for a region of interest;
selecting a first video compression profile that includes higher compression outside the first shape;
selecting a second shape within the first shape of the region of interest and sharing a center of the region of interest;

scaling a size of the second shape in proportion to a network latency times a maximum eye velocity; and selecting a second video compression profile that includes: (1) lower compression inside the second shape; (2) medium compression outside the second shape, but inside the first shape; and (3) higher compression outside the first shape, and wherein the performance characteristics of the network connection include information about the network latency, and comprising:

identifying the center of the region of interest corresponding to a predicted eye position, wherein the center of the region of interest corresponds to the instantaneous eye position plus an offset proportional to the instantaneous eye velocity times the network latency;

compressing the video stream according to the video compression spatial map; and sending the compressed video stream to the observer.

13. The non-transitory, computer-readable medium of claim 12, wherein the receiving of the gaze information is a receiving of gaze information from a head-mounted or display-mounted gaze tracker.

14. The non-transitory, computer-readable medium of claim 12, wherein:

the first video compression profile corresponds to a video quality profile, a video resolution profile, or a video color profile.

15. The non-transitory, computer-readable medium of claim 12, wherein the first video compression profile increases in compression with distance from the center of the region of interest.

* * * * *